US010795485B2

(12) United States Patent
Ehrenberg

(10) Patent No.: US 10,795,485 B2
(45) Date of Patent: Oct. 6, 2020

(54) TOUCH-SENSITIVE INPUT DEVICE WITH IMPROVED HAPTIC GENERATION

(71) Applicant: PREH GMBH, Bad Neustadt a. d. Saale (DE)

(72) Inventor: Jochen Ehrenberg, Rödelmaier (DE)

(73) Assignee: PREH GMBH, Bad Neustadt a. d. Saale (DE)

( * ) Notice: Subject to any disclaimer, the term of this patent is extended or adjusted under 35 U.S.C. 154(b) by 0 days.

(21) Appl. No.: 16/310,625

(22) PCT Filed: Jun. 27, 2017

(86) PCT No.: PCT/EP2017/065813
§ 371 (c)(1),
(2) Date: Dec. 17, 2018

(87) PCT Pub. No.: WO2018/002028
PCT Pub. Date: Jan. 4, 2018

(65) Prior Publication Data
US 2019/0179473 A1    Jun. 13, 2019

(30) Foreign Application Priority Data

Jun. 27, 2016  (DE) .................. 10 2016 111 742

(51) Int. Cl.
*G06F 3/041*       (2006.01)
*G06F 3/01*        (2006.01)
(Continued)

(52) U.S. Cl.
CPC ............ *G06F 3/0414* (2013.01); *G05G 5/03* (2013.01); *G06F 3/016* (2013.01); *G06F 3/03547* (2013.01)

(58) Field of Classification Search
CPC .... G06F 3/0414; G06F 3/016; G06F 3/03547; G05G 5/03
See application file for complete search history.

(56) References Cited

U.S. PATENT DOCUMENTS

2002/0033795 A1    3/2002   Shahoian et al.
2002/0149561 A1*  10/2002   Fukumoto .......... G01C 21/3664
                                                          345/156

(Continued)

FOREIGN PATENT DOCUMENTS

EP        2570889 A2      3/2013
WO     2010054014 A1      5/2010
WO     2013134388 A1      9/2013

OTHER PUBLICATIONS

The International Search Report and the Written Opinion for PCT/EP2017/065813, dated Sep. 7, 2017, ISA,EPO, Rijswijk, The Netherlands.

*Primary Examiner* — Tom V Sheng
(74) *Attorney, Agent, or Firm* — M&B IP Analysts, LLC

(57) ABSTRACT

The present disclosure relates to a touch-sensitive input device, including: a support; a touch-sensitive input part; and a supplementary body that is rigidly connected to the input part that is jointly mounted by means of first bearing means on the support so as to be movable in at least one deflection direction; a damper body that is mounted on the support by means of second bearing means so as to be movable at least in the deflection direction; an actuator acting between the damper body and the combination of input part and supplementary body, having an effective axis in order to cause a movement of the input part substantially counter to the damper body to generate haptic feedback; wherein the input part and the supplementary body define a hollow volume in which at least the actuator is arranged.

13 Claims, 1 Drawing Sheet

(51) Int. Cl.
*G06F 3/0354* (2013.01)
*G05G 5/03* (2008.04)

(56) References Cited

U.S. PATENT DOCUMENTS

| | | | |
|---|---|---|---|
| 2003/0067449 A1* | 4/2003 | Yoshikawa | G06F 3/016 |
| | | | 345/173 |
| 2007/0080951 A1* | 4/2007 | Maruyama | G06F 1/1626 |
| | | | 345/173 |
| 2007/0102270 A1* | 5/2007 | Takashima | G06F 3/016 |
| | | | 200/83 R |
| 2008/0055277 A1* | 3/2008 | Takenaka | G06F 3/016 |
| | | | 345/177 |
| 2008/0197004 A1* | 8/2008 | Ishigaki | B60K 37/06 |
| | | | 200/336 |
| 2009/0174672 A1 | 7/2009 | Schmidt | |
| 2015/0133221 A1 | 5/2015 | Danny | |
| 2016/0132113 A1* | 5/2016 | Hotchkiss | G06F 3/0488 |
| | | | 345/173 |
| 2016/0179200 A1 | 6/2016 | Billington et al. | |
| 2018/0246571 A1* | 8/2018 | Jeitner | G06F 3/0338 |
| 2019/0302888 A1* | 10/2019 | Bodenstein | G06F 3/041 |

* cited by examiner

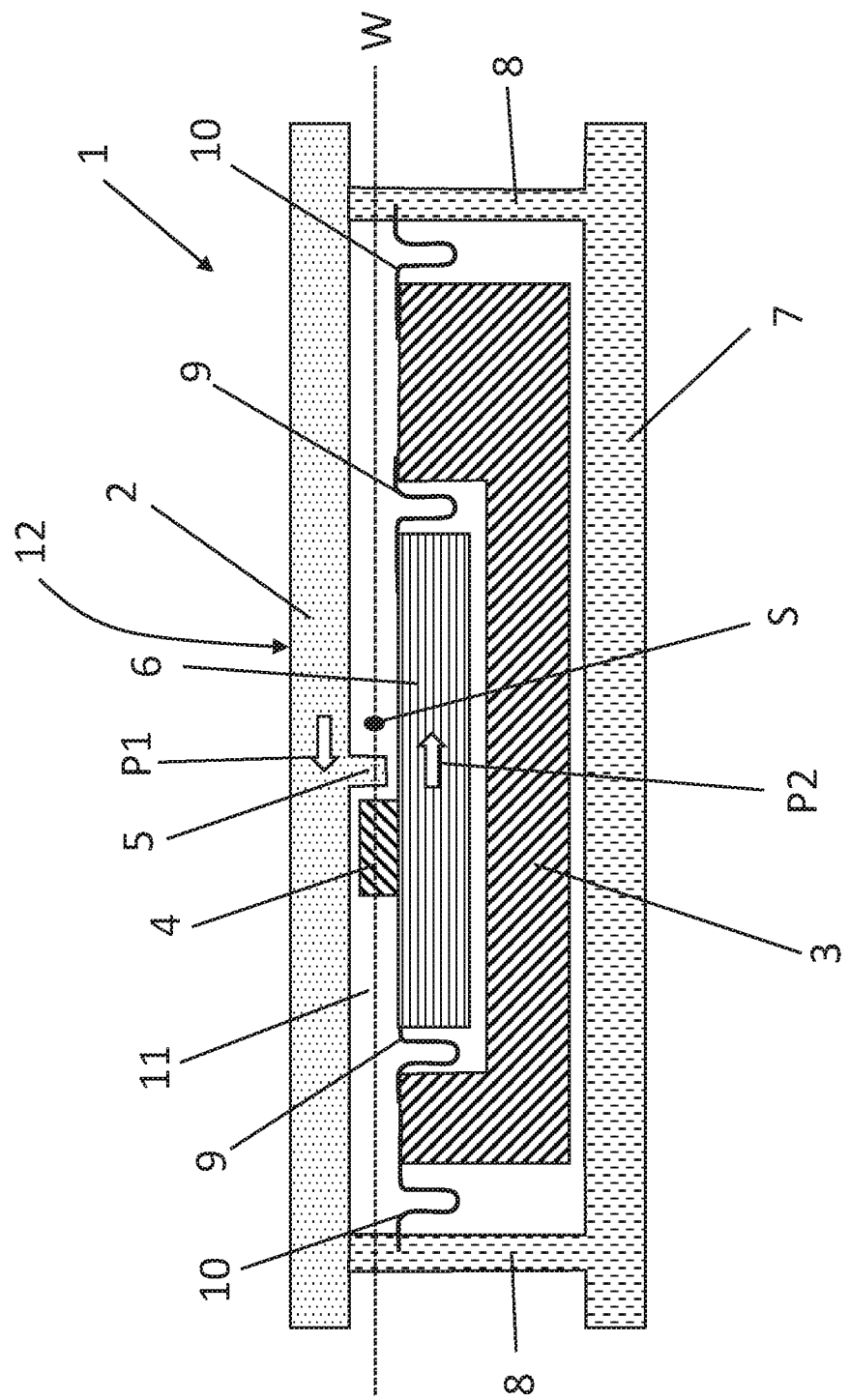

TOUCH-SENSITIVE INPUT DEVICE WITH IMPROVED HAPTIC GENERATION

This application claims priority under 35 U.S.C. § 371 to the International Application No. PCT/EP2017/065813, filed Jun. 27, 2017, and to the German Application No. 10 2016 111 742.0, filed Jun. 27, 2016, now pending, the contents of which are hereby incorporated by reference.

The present disclosure relates to a touch-sensitive input device having a support, a touch-sensitive input part such as a touchpad or touchscreen, in particular an electronic pixel matrix display having a touchscreen, said touch-sensitive input part being mounted on the support by means of a first bearing means so as to be movable in at least one deflection direction. For example, a display is a liquid crystal design or in the style of an OLED. For example, the touchpad or the touchscreen has a capacitive electrode sensor package for touch detection with spatial resolution. In one embodiment, a force sensor is also or alternatively provided for measuring an actuation force associated with the contact acting on the touch-sensitive display.

Generically, an actuator is moreover provided which drives the input part along the deflection direction in order to generate haptic feedback when a touch has occurred, and/or if a predetermined actuating force measured by the force sensor is exceeded, in order to ultimately give feedback to the operator that a touch and/or actuation has been detected, and that a switching or control operation is possibly associated.

With known input devices, the actuator is supported directly on the support, which normally consists essentially of a thermoplastic. Oscillation pulses, which arise in particular as a counter-pulse in the generation of haptics, are thus coupled into the housing. These unwanted excitations, referred to in the following as secondary vibrations, are acoustically perceived by the operator as radiated structure-born noise, or in the form of vibrations of other components, and are felt to be annoying. Furthermore, there is a need to design haptic generation in such a way that a predetermined, reproducible progression of movement, in particular a movement profile, results during the haptic generation as it has originally been initiated by the actuator, for example a substantially transversal progression of movement. At the same time, such input devices are subject to the general requirement of saving installation space.

The object of the present disclosure is therefore to provide an input device with haptic feedback by means of actuator movement excitation, in which an improved movement excitation is ensured by reducing the aforementioned secondary oscillations, and thus as a whole the input device is improved in terms of oscillation and is realized in particular in a space-saving manner. The object is achieved according to the present disclosure by a touch-sensitive input device having the features of claim 1. An equally advantageous use is the subject matter of the coordinate claim. It is noted that the features and measures that are individually listed in the following description may be combined in any technologically sensible manner and illustrate further embodiments of the present disclosure. The description characterizes and specifies the present disclosure, especially also in conjunction with Figures.

The input device according to the present disclosure has a support. The term "support" is to be construed broadly, and generally serves the function of securing and holding the input device, for example on an inner casing, a center console, or a dashboard of a motor vehicle. The support is made from a plastic such as a thermoplastic, for example.

According to the present disclosure, a touch-sensitive input part is also provided. The term "touch-sensitive input part" is also to be construed broadly. This is generally a part of the input device which defines an input surface facing toward the operator, on which a touch by an input member or a finger of an operator is detected by a sensor system, preferably is detected in a spatially resolving manner. The touch-sensitive input part is preferably a touchpad, i.e. a displayless input part with spatially resolving detection of a contact on an input surface belonging to the input part; or a touchscreen, i.e. an input part with spatially-resolving detection of a contact on an input surface belonging to the input part, wherein in the latter instance the input surface is also associated with an electronic display, in particular an electronic pixel matrix display.

For example, one or more sensors for detecting a touch and/or a compressive force on the input surface are associated with the input surface. These are, for example, a plurality of electrodes arranged in a matrix and an associated evaluation unit for spatially-resolving touch detection, and/or one or more force sensors for detecting the compressive force produced by the actuation, such as one or more capacitive force sensors.

According to the present disclosure, a supplementary body is provided that is rigidly connected to the input part. A supplementary body is understood, for example, to be a body which has a higher mass density than a touch-sensitive display, for example of more than 2,000 kg/m$^3$, preferably more than 7,000 kg/m$^3$, more preferably more than 10,000 kg/m$^3$. The additional mass can have any shape. The additional mass is preferably made of a metal such as zinc or lead, or a metal alloy such as a zinc- and/or lead-containing alloy, for example ZAMAK. The additional mass is preferably provided on the side of the input part facing away from the operator.

Furthermore, first bearing means are provided by means of which the input part is mounted on the housing so as to be movable in at least one deflection direction. The first bearing means preferably further comprise first restoring means for elastically restoring the actuating part into a resting position. The first bearing means are, for example, designed as plates of spring steel.

According to the present disclosure, an actuator is also provided in order to drive the input part in motion to generate haptic feedback. The input part is preferably driven linearly. The actuator is preferably an electromotive or electromagnetic actuator. For example, the actuator has a coil whose electromagnetic field, generated by the coil, is designed and arranged for interaction with an armature. According to the present disclosure, this actuator has an active axis describing the effective direction of action, in order to cause a movement of the input part, for example of the touch-sensitive display, to generate haptic feedback in the direction of the deflection.

According to the present disclosure, it is proposed to provide a damper body that is mounted on the support by means of second bearing means so as to be movable at least in the deflection direction. Furthermore, it is provided that the actuator acts between the damper body and the combination of the input part and the supplementary body in that, on the one hand, it is supported on the damper body and, on the other hand, acts on the combination of the input part and supplementary body via the armature in an attractive or repulsive manner in order to cause a movement of the input part to generate haptic response, also called haptic feedback, essentially opposite the deflection of the damper body. The actuator is preferably designed to trigger an approaching movement between input part and damper body.

The damper body is understood, for example, to mean a body which has a higher mass density than a touch-sensitive display, for example more than 2,000 kg/m$^3$, preferably more than 7,000 kg/m$^3$, more preferably more than 10,000 kg/m$^3$. The damper body may have any shape. The damper body is preferably made of a metal such as zinc or lead, or a metal alloy such as a zinc- or lead-containing alloy, for example ZAMAK.

Because the actuator is supported by the damper body mounted so as to be able to oscillate, the generation of haptics effectuated by the actuator may be more readily decoupled from the support in terms of vibration and hence acoustically, since according to the present disclosure the actuator is not supported directly on the carrier, but rather via the damper body that is mounted on the support so as to be movable. This produces a decoupling of the haptic generation. For example, as mentioned above, the actuator is an electromagnetic actuator and the magnetic field-generating means of the actuator are fastened to the damper body, whereas the associated armature is fastened to the combination consisting of input part and supplementary body, for example directly on the supplementary body or on the input part. In particular in this embodiment of the actuator, the respective masses of armature and coil are to be taken into account and added in each case when considering the mass of damper body and input part or supplementary body.

In comparison to an achievement without supplementary body, the object of the supplementary body is to produce a centroid displacement which enables the input device to be structurally designed such that the effective direction of the actuator may be as close as possible to the centroid; preferably, the active axis describing the effective direction of action intersects the common centroid of the combination of the input part and supplementary body in order to minimize the risk of exciting a haptically interfering rotational movement, in particular of the input part.

According to the present disclosure, the input part and the supplementary body define a hollow volume in which at least the actuator is arranged. This allows a space-saving achievement to be accomplished, wherein the actuator and in particular its active axis is arranged as close as possible to centroid of the combination consisting the of input part and supplementary body, so that the excitation of undesired vibrational modes, in particular rotational vibrations, of the input portion may be reduced.

For example, the first bearing means and/or the second bearing means form a bearing based on magnetic repulsion, a rolling bearing, a sliding bearing, or an oscillating supporting or oscillating suspended bearing. The first and second bearing means preferably act in an elastically resilient manner. Even more preferably, the first bearing means and the second bearing means are designed as springs, preferably as spring steel plates that are U-shaped in sections. For example, the second bearing means associated with the damper body comprise four springs, and the first bearing means associated with the combination consisting of the input part and supplementary body also comprise four springs.

The first bearing means and the second bearing means are preferably arranged in a common plane.

In order to realize a particularly compact embodiment with simultaneously pronounced centroid displacement, according to a preferred embodiment the support is arranged such that it engages in the hollow volume defined by the input part and the supplementary body.

For example, the resonant frequency of the oscillating systems consisting of damper body on the one hand and the combination of input part and supplementary body is configured to substantially coincide in that the respective spring constants of the associated bearing means are set corresponding to the masses.

To match the respective deflection speeds of damper body on the one hand and the combination consisting of input part and supplementary body on the other hand, the spring constant of the second bearing means preferably always differs in comparison to the spring constant of the first bearing means. The spring constant of the second bearing means is preferably respectively smaller in comparison to the spring constant of the first bearing means.

The springs are preferably arranged and designed so that they are each stressed at their shear center. The shear center is determined by the cross-section of the respective spring, orthogonal to the deflection direction.

According to a further preferred embodiment, at least one vibration damper is furthermore provided. The deflection speeds, or the maximum deflections, can therefore advantageously be limited.

The vibration damper is preferably provided between the support and the damper body in order to have a damping effect with respect to the deflection of the damper body.

The mass of the damper body, insofar as it is present, including the previously described coil, is preferably less than the total mass of input part and supplementary body.

The mass of the damper body is preferably greater than one quarter of the mass of the input part; the mass of the damper body is preferably greater than one quarter of the total mass of input part and supplementary body.

The effective axis of the actuator, which describes the effective direction of action, is preferably parallel to an input surface defined by the input part.

The centroid, determined by the input part and the supplementary body, is preferably located on the active axis of the actuator.

For example, the damper body is designed in the form of a plate. Spatially relative to an operator, the damper body is preferably arranged below the input part, preferably between the input part and the supplementary body, even more preferably between the input part and the support.

The present disclosure further relates to the use of the touch-sensitive input device in of the embodiments described above in a motor vehicle, in particular in a center console of a motor vehicle.

The present disclosure, as well as the technical environment, will be further explained in the following with reference to the FIGURE. It is noted that the FIGURE shows a particularly preferred embodiment variant of the present disclosure; however, the present disclosure is not limited thereto. Schematically shown are:

FIG. 1 a sectional view of an embodiment of the input device according to the present disclosure.

FIG. 1 shows an embodiment according to the present disclosure of the input device 1. It has a support 3 that serves for the attachment of the input device 1 at a center console (not shown) or an instrument panel (not shown) of a motor vehicle. A combination of an input part 2 and a supplementary body 7 is mounted on the support 3 so as to be movable. In the present embodiment, the input part 3 is a touchscreen, i.e. a combination of an electronic pixel matrix display with a capacitive touch sensor system, wherein the letter detects the contacting of the input surface 12 defined by the input part 2.

The input part 2 is rigidly connected to the otherwise plate-shaped supplementary body 7 via the fastening posts 8. Both supplementary body 7 and input part 2 are mounted on the support 3 in a movable and elastically resilient manner via the first bearing means 10. The first bearing means 10 are four spring steel plates which are U-shaped in sections. The first bearing means 10 are arranged in such a way that a restoring movement of the input part 2, together with the supplementary body 7 rigidly connected to the input part, is made possible in a direction parallel to the input surface 12.

The mass of the supplementary body 7 is selected to be such that the common centroid S is located between the input part 2 and the supplementary body 7, and thus is arranged in the plane in which lies the active axis of an electromagnetic actuator 4, indicated by line W, which electromagnetic actuator 4 serves for the electromagnetically induced deflection of the input part 2 together with the supplementary weight 7 from the resting position, as indicated by the arrow P1, in order to cause haptic feedback to the operator due to the deflection and its haptic perceptibility by a finger touching the input surface 12. The actuator 4 has a coil and an armature 5 which interacts with the magnetic field of the coil and is provided on the input part 2.

As FIG. 1 further shows, the actuator 4, in particular its coil, is supported on a plate-shaped damper body 6 that for its part is mounted on the support 3 via restoring second bearing means 9. The second bearing means 9 are likewise springs made of spring steel plates which are U-shaped in sections. The springs of the first bearing means 10 and of the second bearing means 9 are arranged in a common plane. Furthermore, the springs of the first bearing means 10 and of the second bearing means 9 are each arranged and configured such that they are respectively stressed by the actuator 4 at their shear center counter to their restoring action. The shear center is determined by the cross-section of the respective spring that is orthogonal to the deflection direction.

The elastic bearing of the damper body 6, provided by the second bearing means 9, serves to absorb the counter-pulses P2 generated by the actuator 4 so that, because it is elastically supported via the damper body 6, the actuator 4 and thus the haptic generation are decoupled from the support 3 with regard to the transmission of impact and vibration. The acoustic sound transmission into the support 3, and in particular into the vehicle surroundings arranged adjacent to the support 3 such as a center console cladding or the like, said acoustic sound transmission being caused by the haptic generation, is therefore reduced.

The aforementioned supplementary body 7 and the centroid S resulting due to the supplementary body 7 also ensure that the input part 2 experiences an at least approximately pure transversal vibration excitation, i.e. optimally without rotational vibration modes, via the actuator 4. As can be seen from FIG. 1, the actuator 4, the damper body, and the support 3 are entirely or at least partially arranged in a hollow volume 11 defined by the input part 2 and the supplementary body 7. A space-saving design of the input device 1 is thus achieved on the one hand. On the other hand, this design makes it possible to realize excitation movement by the actuator 4 that is optimally purely translatory, i.e. is optimally free of rotational oscillations. Only because of the construction that defines the cavity 11 is it possible for the active axis W of the actuator to intersect the common centroid of input part 2 and supplementary body 7, and at the same time for the effective axis W to run parallel to the input surface 12.

To realize a space-saving embodiment, the damper body 6 is arranged in a recess of the support 3. To match the respective deflection speeds of damper body 6 on the one hand and the combination consisting of input part 2 and supplementary body 7 on the other hand, the spring constant of the second bearing means 9 is respectively different in comparison to the spring constant of the first bearing means 10. The mass of the damping body 6, including the coil belonging to the actuator 4, is less than the total mass of input part 2 and supplementary body 7, but at the same time is greater than one quarter of the mass of the input portion 2.

What is claimed is:

1. A touch-sensitive input device, comprising:
   a support;
   a touch-sensitive input part; and
   a supplementary body that is rigidly connected to the input part that is jointly mounted by means of first bearing means on the support so as to be movable in at least one deflection direction;
   a damper body that is mounted on the support by means of second bearing means so as to be movable at least in the deflection direction;
   an actuator acting between the damper body and a combination of input part and supplementary body, having an effective axis in order to cause a movement of the input part substantially counter to the damper body to generate haptic feedback;
   wherein the input part and the supplementary body define a hollow volume in which at least the actuator is arranged; and
   wherein the effective axis is parallel to an input surface defined by the input part.

2. The touch-sensitive input device of claim 1, wherein the first bearing means and second bearing means are arranged in a common plane.

3. The touch-sensitive input device of claim 1, wherein the support is arranged engaging in the hollow volume.

4. The touch-sensitive input device of claim 1, wherein the first bearing means and the second bearing means are designed as springs.

5. The touch-sensitive input device of claim 4, wherein a spring constant of the second bearing means is different than the spring constant of the first bearing means.

6. The touch-sensitive input device of claim 4, wherein the springs are arranged and configured so that they are each stressed at their shear center.

7. The touch-sensitive input device of claim 1, wherein at least one vibration damper is also provided.

8. The touch-sensitive input device of claim 7, wherein the vibration damper is provided between the support and the damper body.

9. The touch-sensitive input device of claim 1, wherein a mass of the damper body is less than a total mass of the input part and the supplementary body.

10. The touch-sensitive input device of claim 9, wherein the mass of the damper body is greater than one quarter of the mass of the input part.

11. The touch-sensitive input device of claim 1, wherein a centroid defined by the input part and the supplementary body lies on the effective axis.

12. The touch-sensitive input device of claim 1, wherein the actuator is an electromagnetic linear actuator.

13. The touch-sensitive input device of claim 1 configured for use in a motor vehicle.

* * * * *